(12) United States Patent
Burkhardt

(10) Patent No.: US 10,620,060 B2
(45) Date of Patent: Apr. 14, 2020

(54) COMBINED ULTRASONIC TEMPERATURE AND CONDUCTIVITY SENSOR ASSEMBLY

(71) Applicant: Georg Fischer Signet, LLC, El Monte, CA (US)

(72) Inventor: Gert Burkhardt, Pasadena, CA (US)

(73) Assignee: Georg Fischer Signet, LLC, El Monte, CA (US)

(*) Notice: Subject to any disclaimer, the term of this patent is extended or adjusted under 35 U.S.C. 154(b) by 235 days.

(21) Appl. No.: 15/654,616

(22) Filed: Jul. 19, 2017

(65) Prior Publication Data

US 2019/0025136 A1 Jan. 24, 2019

(51) Int. Cl.
*G01K 11/22* (2006.01)
*G01N 29/024* (2006.01)
(Continued)

(52) U.S. Cl.
CPC ............ *G01K 11/22* (2013.01); *G01F 1/6882* (2013.01); *G01K 13/02* (2013.01); *G01N 25/20* (2013.01);
(Continued)

(58) Field of Classification Search
CPC ......... G01N 29/2437; G01N 2291/014; G01N 25/18; G01N 21/1702; G01K 11/24;
(Continued)

(56) References Cited

U.S. PATENT DOCUMENTS

| 2,582,249 A | 1/1952 | Hendel |
| 3,178,940 A * | 4/1965 | Dahlke ................ G01F 1/665 73/861.26 |

(Continued)

FOREIGN PATENT DOCUMENTS

| CN | 104090020 A | 10/2014 |
| DE | 19706486 A1 | 8/1998 |

(Continued)

OTHER PUBLICATIONS

Bevilacqua, Anthony C., et al., "Advances in Resistivity Instrumentation for UPW Systems of the Future".
(Continued)

*Primary Examiner* — Gail Kaplan Verbitsky
(74) *Attorney, Agent, or Firm* — Tsircou Law, P.C.

(57) ABSTRACT

A sensor assembly is provided for conductivity measurement and ultrasonic temperature measurement. The assembly includes an elongated sensor body aligned along a longitudinal axis extending from an electronics housing. The sensor body has a plurality of elongated electrodes disposed about the longitudinal axis defining a measurement section, and a pair of ultrasonic transceivers mounted to the body in spaced relationship across the measurement section, in which a first transceiver of the pair is attached to a proximal end of the sensor body and a second transceiver of the pair is attached to a distal end of the sensor body across the measurement section. The electronics housing is in operable communication with the plurality of electrodes and to the pair of ultrasonic transceivers to measure fluid parameters within the measurement section.

17 Claims, 2 Drawing Sheets

(51) Int. Cl.
- *G01N 27/08* (2006.01)
- *G01F 1/688* (2006.01)
- *G01N 27/06* (2006.01)
- *G01K 13/02* (2006.01)
- *G01N 25/20* (2006.01)
- *G01N 27/04* (2006.01)

(52) U.S. Cl.
CPC ............. *G01N 27/04* (2013.01); *G01N 27/06* (2013.01); *G01N 27/08* (2013.01); *G01N 29/024* (2013.01); *G01N 2291/02881* (2013.01)

(58) Field of Classification Search
CPC ........ G01K 11/26; G01K 17/00; G01K 13/00; G01K 11/22; G01K 13/02
USPC .............................. 374/137, 44, 45, 147, 148
See application file for complete search history.

(56) References Cited

U.S. PATENT DOCUMENTS

| | | | |
|---|---|---|---|
| 3,332,446 A | 7/1967 | Mann | |
| 3,353,400 A * | 11/1967 | Schafft | B06B 1/0644 310/322 |
| 3,424,930 A * | 1/1969 | List | G01L 1/16 310/338 |
| 3,490,496 A | 1/1970 | Stearns | |
| 3,870,033 A | 3/1975 | Faylor et al. | |
| 4,065,675 A * | 12/1977 | Gold | G01N 1/10 250/576 |
| 4,130,904 A | 12/1978 | Whalen | |
| 4,236,509 A | 12/1980 | Takahashi et al. | |
| 4,415,185 A | 11/1983 | Vinciguerra et al. | |
| 4,545,244 A | 10/1985 | Yasuda et al. | |
| 4,765,602 A | 8/1988 | Roeseler | |
| 4,815,323 A * | 3/1989 | Ellinger | G01F 23/2962 374/142 |
| 4,966,202 A | 10/1990 | Bryan et al. | |
| 5,326,035 A | 7/1994 | Ohmi et al. | |
| 5,385,664 A | 1/1995 | Oinuma et al. | |
| 5,482,089 A | 1/1996 | Weber et al. | |
| 5,678,809 A | 10/1997 | Nakagawa et al. | |
| 5,868,924 A | 2/1999 | Nachtman et al. | |
| 5,905,207 A * | 5/1999 | Schalk | G01F 1/662 73/861.28 |
| 5,954,965 A | 9/1999 | Kubota et al. | |
| 6,156,578 A | 12/2000 | Tom | |
| 6,176,138 B1 | 1/2001 | Barr et al. | |
| 6,234,163 B1 | 5/2001 | Garrod | |
| 6,332,360 B1 * | 12/2001 | Su | G01F 1/007 374/E11.01 |
| 6,418,769 B1 | 7/2002 | Schreiner | |
| 6,596,236 B2 | 7/2003 | DiMeo, Jr. et al. | |
| 6,729,181 B2 | 5/2004 | Mayer et al. | |
| 6,733,661 B2 | 5/2004 | Mukogawa et al. | |
| 6,830,076 B1 | 12/2004 | Patel | |
| 7,225,678 B2 | 6/2007 | Kandler et al. | |
| 7,360,450 B2 | 4/2008 | Müller | |
| 7,490,632 B2 | 2/2009 | Grebe | |
| 7,550,979 B2 | 6/2009 | Zhou et al. | |
| 7,954,387 B1 | 6/2011 | Furlong | |
| 7,987,732 B2 | 8/2011 | Konzelmann et al. | |
| 7,993,056 B2 * | 8/2011 | Amemiya | G01S 15/899 374/117 |
| 8,302,455 B2 * | 11/2012 | Straub, Jr. | G01F 1/66 73/1.34 |
| 8,523,432 B2 | 9/2013 | Mujumdar et al. | |
| 8,776,593 B2 | 7/2014 | Margalit et al. | |
| 8,955,392 B2 | 2/2015 | Liu et al. | |
| 9,188,259 B2 | 11/2015 | Fiolek et al. | |
| 9,297,680 B2 | 3/2016 | Maruyama et al. | |
| 9,422,953 B2 | 8/2016 | Ehrlich et al. | |
| 9,465,000 B1 * | 10/2016 | Brown | G01N 27/026 |
| 9,945,737 B2 * | 4/2018 | DeSilva | G01K 1/20 |
| 10,041,620 B2 | 8/2018 | Balmer et al. | |
| 2003/0011386 A1 | 1/2003 | Xie et al. | |
| 2003/0029242 A1 * | 2/2003 | Yaralioglu | G01H 5/00 73/597 |
| 2007/0018650 A1 | 1/2007 | Bhansali et al. | |
| 2009/0085583 A1 | 4/2009 | Waid et al. | |
| 2010/0201984 A1 | 8/2010 | Schuda et al. | |
| 2011/0088483 A1 | 4/2011 | Will et al. | |
| 2013/0061686 A1 | 3/2013 | Fujii et al. | |
| 2013/0336095 A1 * | 12/2013 | Seppa | G01L 9/0016 367/137 |
| 2018/0283917 A1 | 10/2018 | Murakami et al. | |

FOREIGN PATENT DOCUMENTS

| | | |
|---|---|---|
| DE | 102008013224 | 9/2009 |
| EP | 0582329 | 2/1994 |
| EP | 1099102 B1 | 5/2008 |
| EP | 1531731 B1 | 8/2012 |
| JP | 2002062275 | 2/2002 |
| JP | 2004044600 A | 2/2004 |
| JP | 05373607 B2 | 12/2013 |
| JP | 2015152568 A | 8/2015 |
| WO | WO2009144153 | 12/2009 |
| WO | WO2012/076612 | 6/2012 |
| WO | WO2013063676 A * | 5/2013 |

OTHER PUBLICATIONS

Bevilacqua, Anthony C., et al., "The Effect of Temperature, Temperature Error, and Impurities on Compensated Resistivity Measurements".

Bevilacqua, Anthony C., et al., "Ultrapure Water—The Standard for Resistivity Measurements of Ultrapure Water".

* cited by examiner

COMBINED ULTRASONIC TEMPERATURE AND CONDUCTIVITY SENSOR ASSEMBLY

FIELD OF THE INVENTION

The present invention relates generally to sensors for measuring fluids, more particularly, to combined sensor assemblies for measuring temperature and conductivity/resistivity.

BACKGROUND OF THE INVENTION

Sensor assemblies have been used to measure properties of fluids, such as fluid flow, density, viscosity, conductivity, temperature, among others. Moreover, through the measurement of multiple properties of a fluid, accuracy can be improved.

For example, U.S. Pat. No. 8,326,555, which incorporated by reference, disclosures a system and related method measuring conductivity/resistivity of water having high purity, using both a temperature sensor and a conductivity/resistivity sensor. The system calibrates the sensor continually during use, in real time, resulting in highly improved accuracy. More particularly, the system determines change in resistivity over a change in temperature (a collected R/T slope) from the collected temperature measurements and the collected resistivity measurements. The system compares the collected R/T slope to a standardized R/T slope at a temperature value corresponding to a midpoint temperature of the temperature measurements over the prescribed time interval. Based on the comparing, the system provides a compensated measurement for resistivity or conductivity of the water source. As a result, the system can calibrate the sensor continually during use, in real time, resulting in improved accuracy of the water purity measurement.

Such combined measurement strategies rely upon timely and accurate measurements. Although current sensors for temperature and conductivity have been generally effective for the above system, shortfall exists. For example, the time delay between conductivity and temperature measurements can make the correlation to determine the water purity inaccurate or impossible when the process changes too quickly. Furthermore, classical temperature sensors can have limited resolution and frequently suffer from comparably high signal noise.

It should therefore be appreciated that there remains a need for a sensor assembly that addresses these concerns. The present invention fulfills these needs and others.

SUMMARY OF THE INVENTION

Briefly, and in general terms, the invention provides a sensor assembly for conductivity measurement and ultrasonic temperature measurement. The assembly includes an elongated sensor body aligned along a longitudinal axis extending from an electronics housing. The sensor body has a plurality of elongated electrodes disposed about the longitudinal axis defining a measurement section, and a pair of ultrasonic transceivers mounted to the body in spaced relationship across the measurement section, in which a first transceiver of the pair is attached to a proximal end of the sensor body and a second transceiver of the pair is attached to a distal end of the sensor body across the measurement section. The electronics housing is in operable communication with the plurality of electrodes and to the pair of ultrasonic transceivers to measure fluid parameters within the measurement section.

In an exemplary embodiment, the sensor body includes a proximal mount and a distal mount disposed on the longitudinal axis in spaced relationship to the proximal mount. The plurality of elongated electrodes extend between the proximal mount and the distal mount disposed parallel with and disposed in space relationship to the longitudinal axis, defining a measurement section. The pair of ultrasonic transceivers are mounted to the body in spaced relationship across the measurement section, in which a first transceiver of the pair is attached to a proximal mount of the sensor body and a second transceiver of the pair is attached to a distal mount of the sensor body across the measurement section.

In a detailed feature of an exemplary embodiment, the pair of ultrasonic transceivers are used to determine temperature of the fluid, and the plurality of electrodes are used to determine conductivity of the fluid.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

For convenience of reference, the terms "resistivity" and "conductivity" are used throughout, without repeated reference as to their reciprocal relationship. However, unless otherwise specified, reference to either "resistivity" or "conductivity" is intended also to refer the corresponding reciprocal term.

Figure 1:
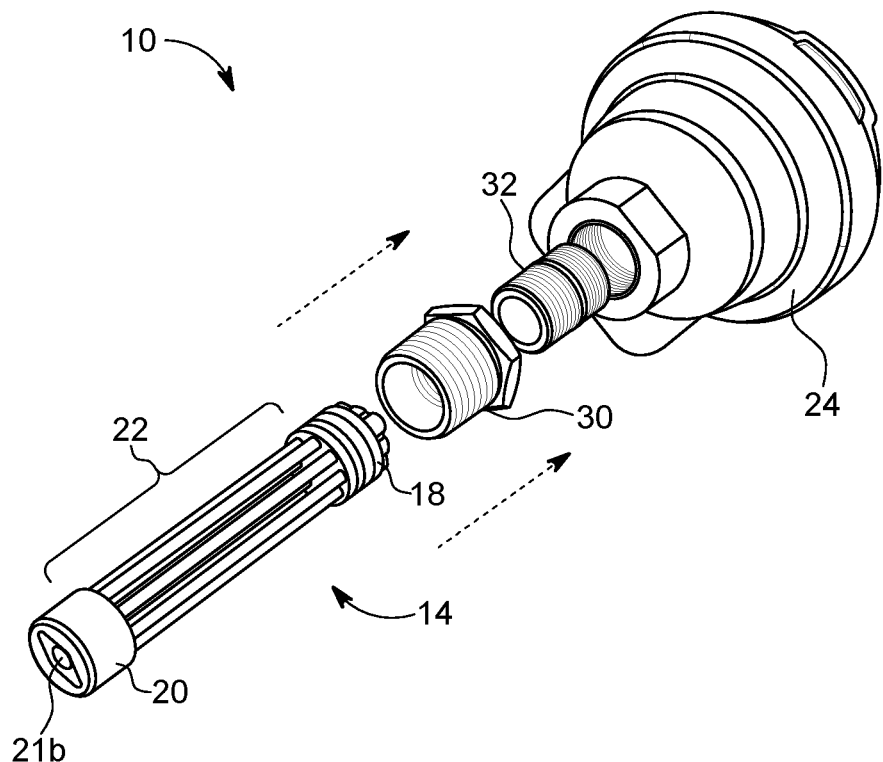
FIG. 1 is a partially exploded, perspective view of a combination sensor assembly for temperature and conductivity/resistivity in accordance with the present invention, depicting an electronics housing mounted atop a sensor body.

Referring now to the drawings, and particularly FIG. 1, there is shown an insertion sensor assembly 10 for measuring conductivity/resistivity and temperature. The sensor assembly includes a sensor body 14 mounted to an electronics housing 24 configured for connection to a pipe having a flow of fluid, so that the sensor body is exposed to the fluid flow. The sensor body includes a plurality of tubes (electrodes) 16(a-h) (FIG. 2) extending between a proximal mount 18 and a distal mount 20 in a concentric arrangement about a measurement section 22. The tubes 16 comprise active electrodes and ground electrodes to measure conductivity/resistivity of fluid within the measurement section. The sensor body further includes a pair of ultrasonic transceivers 21(a, b) coupled to the proximal mount 18 and the distal mount 20, respectively, in spaced relationship across the measurement section 22, to measure parameters of the fluid within the measurement section, such as temperature.

Figure 2:
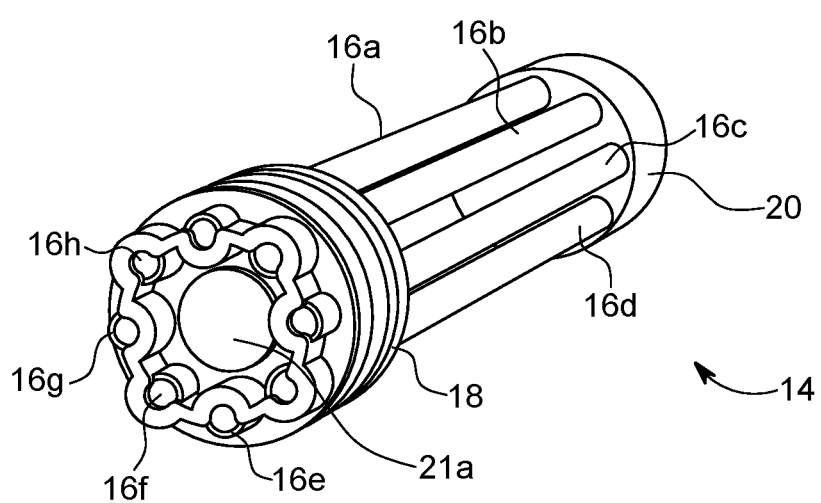
FIG. 2 is a perspective view from the proximal end of the sensor body of the sensor assembly of FIG. 1.
Figure 3:
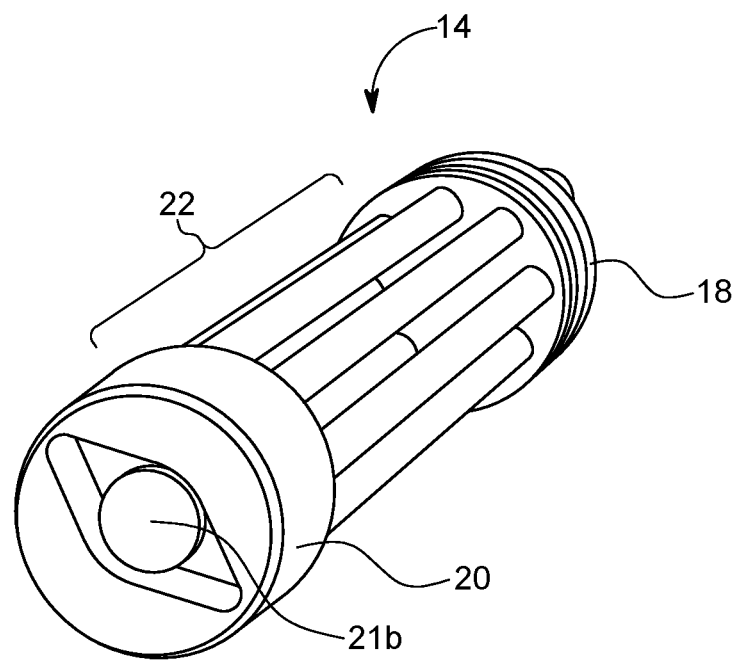
FIG. 3 is a perspective view from the distal end of the sensor body of the sensor assembly of FIG. 1.

With reference to FIGS. 2 and 3, the electrodes 16 comprise four active electrodes 16(a, c, e, g) and four ground electrodes 16(b, d, f, h), in an alternating arrangement to measure conductivity/resistivity of fluid within the measurement section. The fluid conductivity is measured by applying a small AC voltage to the electrodes while measuring the resulting AC current. The quotient of the current divided by the voltage will give the conductance of the electrodes in the fluid. After applying the electrode geometry dependent cell constant to the conductance value, the desired fluid conductivity can be established as a matter of standard methods performing such measurements.

The eight electrodes are arranged in a circular pattern around the path of the ultrasonic signal as to achieve optimal congruence between the fluid volume where conductivity is measured and the fluid volume where the ultrasonic measurement takes place. However, alternate electrode arrangements are feasible, as an example only four electrode rods or unsymmetrical arrangements which may have advantages depending on the shape of the piping system to be installed in.

With continued reference to FIGS. 2 and 3, transceivers 21 are piezo-disks attached to sensor cavities in the central regions of the proximal mount 18 and the distal mount 20. The transceivers are operatively coupled using wires to electronics within the housing 12. In the exemplary embodiment, the wiring from the distal transceiver passes through one of the tubes 16, to operative couple to the electronics. The piezo disks can be made from piezoelectric material like lead zirconium titanate, quartz crystal or piezoelectric polymer. The transceivers are spaced across the measurement section 22, so that the transceivers have a clear communication across the measurement section, unimpeded by the tubes 16. Typically ultrasound frequencies in the range between 1 MHz to 5 MHz work best for liquid media.

In the exemplary embodiment, the ultrasonic transceivers are used to determine the temperature of the fluid. More particularly, the transit time of an ultrasonic pulse between the transceivers in both directions will be measured using timing circuitry contained in standard semiconductor chips (ASIC). Given the known distance between the surfaces of the proximal and the distal mounts 20, the speed of sound in the fluid is calculated. Since the temperature dependence of the speed of sound in the fluid (pure water) is known public information (from literature, text books), the actual fluid temperature can be established using a lookup table or appropriate algorithm. Unlike physical temperature sensors like thermocouples or RTD elements, the ultrasonic measurement method has no time delay and measures the temperature in the fluid instantly. In other embodiment, other parameters of the fluid in the measurement section can be determined. For example, if the sensor is installed in a flow cell or pipe that forces a flow of the fluid along the center axis of the sensor, the difference in upstream and downstream transit times between the two ultrasonic transceivers can be used to measure flow velocity and eventually volumetric flow rate according to commonly known methods for ultrasonic transit time flow meters.

With reference again to FIG. 1, the sensor body 14 defines a longitudinal axis ($A_L$). The plurality of elongated electrodes 16(a-h) are parallel with and disposed in space relationship to the longitudinal axis ($A_L$), circumscribing the measurement section in spaced relationship. Moreover, the pair of ultrasonic transceivers are disposed along the longitudinal axis of the sensor body. The sensor body 14 further includes couplers (30, 32) for coupling the sensor body to the housing 24 and to fluid housing (e.g., pipe). The electronics housing is mounted to the body in a separable manner. The wiring of the transceivers 21 and the electrodes 16, pass through the couplers to the electronics (not shown) within housing. Specifically, the wires connecting the electronics housing with the transceiver at the distal end of the sensor assembly are routed through one or more of the tubular ground electrodes.

Figure 4:
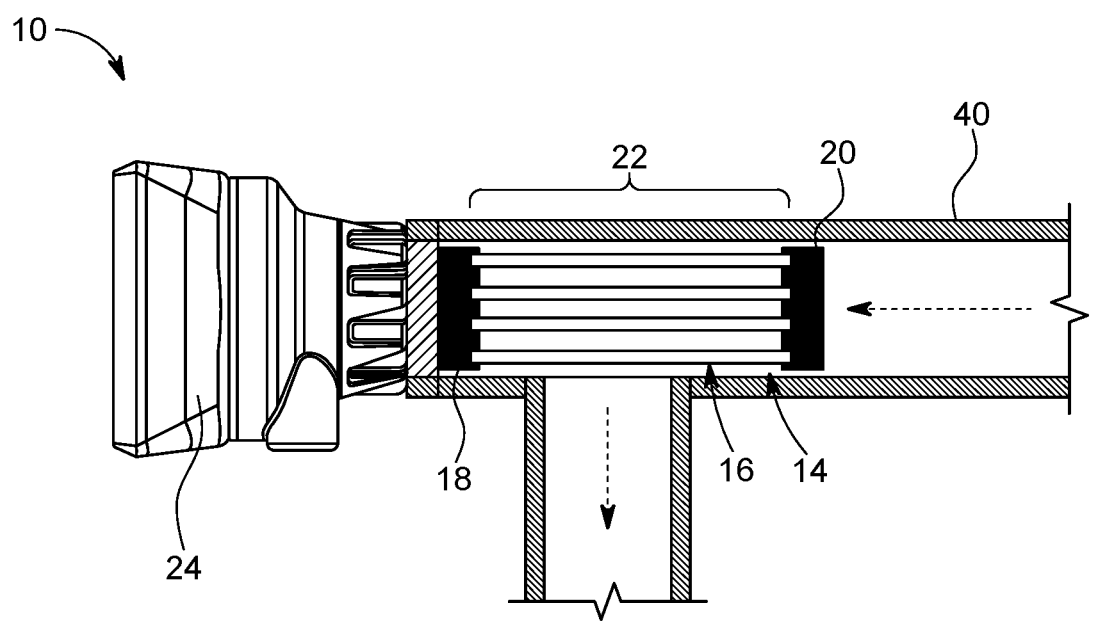
FIG. 4 is side view of the sensor assembly of FIG. 1 mounted to a pipe (shown in cross section).

With reference now to FIG. 4, the sensor assembly 10 is mounted to a pipe 40 having a flow of fluid, (depicted by dashed arrows). In the exemplary embodiment, the sensor assembly 10 is configured as an insertion sensor in which the sensor body 14 extends into the pipe and the electronics housing is disposed outside the pipe. The fluid flows about the sensor body into the measurement section. Notably, a portion of the flow passes diagonally relative to the longitudinal axis of the sensor body. The ultrasonic transceivers communicate across the measurement section.

It should be appreciated from the foregoing that the present invention provides a combination sensor assembly for conductivity measurement and ultrasonic temperature measurement. The assembly includes an elongated sensor body aligned along a longitudinal axis extending from an electronics housing. The sensor body has a plurality of elongated electrodes disposed about the longitudinal axis defining a measurement section, and a pair of ultrasonic transceivers mounted to the body in spaced relationship across the measurement section, in which a first transceiver of the pair is attached to a proximal end of the sensor body and a second transceiver of the pair is attached to a distal end of the sensor body across the measurement section. The electronics housing is in operable communication with the plurality of electrodes and to the pair of ultrasonic transceivers to measure fluid parameters within the measurement section.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:
1. A sensor assembly, comprising:
an elongated sensor body aligned along a longitudinal axis having
a plurality of elongated electrodes disposed about the longitudinal axis defining a measurement section, and
a pair of ultrasonic transceivers mounted to the body in spaced relationship across the measurement section, in which a first transceiver of the pair is attached to a proximal end of the sensor body proximate to a wall of a body that enables fluid flow therein and a second transceiver of the pair is attached to a distal end of the sensor body spaced apart from the distal end and within the fluid flow, across the measurement section; and an electronics housing coupled to the proximal end of the sensor body, the electronics housing is in operable communication with the plurality of electrodes and to the pair of ultrasonic transceivers, in which the plurality of electrodes are used to measure conductivity of the fluid within the measurement section.

2. The sensor assembly as defined in claim 1, wherein the electronics housing is mounted to the body in a separable manner, when mounted, the electronics housing is in operable communication with the pair of ultrasonic transceivers and the plurality of electrodes to measure conductivity and temperature of the fluid within the measurement section.

3. The sensor assembly as defined in claim 1, wherein the pair of ultrasonic transceivers are used to measure temperature of the fluid.

4. The sensor assembly as defined in claim 1, wherein the plurality of electrodes include at least one active electrode and at least one ground.

5. The sensor assembly as defined in claim 1, wherein the pair of ultrasonic transceivers are disposed along the longitudinal axis of the sensor body.

6. The sensor assembly as defined in claim 1, wherein the plurality of elongated electrodes are parallel with and disposed in spaced relationship to the longitudinal axis.

7. The sensor assembly as defined in claim 6, wherein the plurality of elongated electrodes circumscribe the measurement section in spaced relationship.

8. The sensor assembly as defined in claim 1, configured as an insertion sensor in which the sensor body extends into a flow of fluid within a pipe and the electronics housing is disposed outside the pipe.

9. A sensor assembly, comprising:
an elongated sensor body aligned along a longitudinal axis having
a proximal mount disposed on the longitudinal axis to connect to a wall of a body that enables fluid flow therein,
a distal mount disposed on the longitudinal axis in spaced relationship to the proximal mount to project into the fluid flow within the body;
a plurality of elongated electrodes extending between the proximal mount and the distal mount disposed about the longitudinal axis defining a measurement section, and
a pair of ultrasonic transceivers mounted to the body in spaced relationship across the measurement section, in which a first transceiver of the pair is attached to the proximal mount of the sensor body, and a second transceiver of the pair is attached to the distal mount of the sensor body across the measurement section, wherein the pair of ultrasonic transceivers are disposed along the longitudinal axis of the sensor body; and
an electronics housing coupled to the proximal end of the sensor body, the electronics housing is in operable communication with the plurality of electrodes and to the pair of ultrasonic transceivers to measure fluid parameters within the measurement section; wherein the pair of ultrasonic transceivers are used to determine temperature of the fluid.

10. The sensor assembly as defined in claim 9, wherein the electronics housing is mounted to the body in a separable manner, when mounted, the electronics housing is in operable communication with the pair of ultrasonic transceivers and the plurality of electrodes to measure fluid parameters within the measurement section.

11. The sensor assembly as defined in claim 9, wherein the plurality of electrodes are used to determine conductivity of the fluid.

12. The sensor assembly as defined in claim 9, wherein the plurality of elongated electrodes are parallel with and disposed in space relationship to the longitudinal axis.

13. The sensor assembly as defined in claim 12, wherein the plurality of elongated electrodes circumscribe the measurement section in spaced relationship.

14. A sensor assembly, comprising:
an elongated sensor body aligned along a longitudinal axis having
a proximal mount disposed on the longitudinal axis to connect to a wall of a body that enables fluid flow therein,
a distal mount disposed on the longitudinal axis in spaced relationship to the proximal mount to project into the fluid flow within the body;
a plurality of elongated electrodes extending between the proximal mount and the distal mount disposed parallel with and disposed in space relationship to the longitudinal axis, defining a measurement section, and
a pair of ultrasonic transceivers mounted to the body in spaced relationship across the measurement section, in which a first transceiver of the pair is attached to a proximal mount of the sensor body and a second transceiver of the pair is attached to a distal mount of the sensor body across the measurement section; and
an electronics housing coupled to the proximal end of the sensor body, the electronics housing is in operable communication with the plurality of electrodes and to the pair of ultrasonic transceivers to measure fluid parameters within the measurement section, the plurality of electrodes are used to determine conductivity of the fluid.

15. The sensor assembly as defined in claim 14, wherein the pair of ultrasonic transceivers are disposed along the longitudinal axis of the sensor body.

16. The sensor assembly as defined in claim 14, wherein the electronics housing is mounted to the body in a separable manner, when mounted, the electronics housing is in operable communication with the pair of ultrasonic transceivers and the plurality of electrodes to measure fluid parameters within the measurement section.

17. The sensor assembly as defined in claim 14, configured as an insertion sensor in which the sensor body extends into a flow of fluid with a pipe and the electronics housing is disposed outside the pipe.

* * * * *